Jan. 9, 1968   R. F. THORNTON   3,362,258
LOCKING DIFFERENTIAL

Filed Jan. 16, 1964   10 Sheets-Sheet 3

INVENTOR.
RAY F. THORNTON
BY
KOTTS & SHERIDAN
ATTORNEYS

Jan. 9, 1968 R. F. THORNTON 3,362,258
LOCKING DIFFERENTIAL
Filed Jan. 16, 1964 10 Sheets-Sheet 9

INVENTOR
RAY F. THORNTON
KOTTS & SHERIDAN
ATTORNEYS

Jan. 9, 1968 R. F. THORNTON 3,362,258
LOCKING DIFFERENTIAL
Filed Jan. 16, 1964 10 Sheets-Sheet 10

Fig. 19

INVENTOR.
RAY F. THORNTON
BY
EARL F. KOTTS
ATTORNEY

United States Patent Office 3,362,258
Patented Jan. 9, 1968

3,362,258
LOCKING DIFFERENTIAL
Ray F. Thornton, 8735 Jackson Road,
Dexter, Mich. 48130
Filed Jan. 16, 1964, Ser. No. 340,849
22 Claims. (Cl. 74—711)

The present invention relates to improvements in a locking differential, particularly but not exclusively adapted for use with motor vehicles.

This application is a continuation-in-part of my patent applications, Ser. No. 580,024 filed Apr. 23, 1956, now abandoned, Ser. No. 764,470 filed Aug. 26, 1958, now abandoned, and Ser. No. 82,129 filed Jan. 11, 1961, now abandoned.

When rotating power is applied to one of two gears which are in mesh, there is a tendency of the gears to spread apart. This action shall be referred to herein as the "spreading force." The action is demonstrated in FIGS. 13 and 14 of the drawings.

Figures 12, 13, 14:
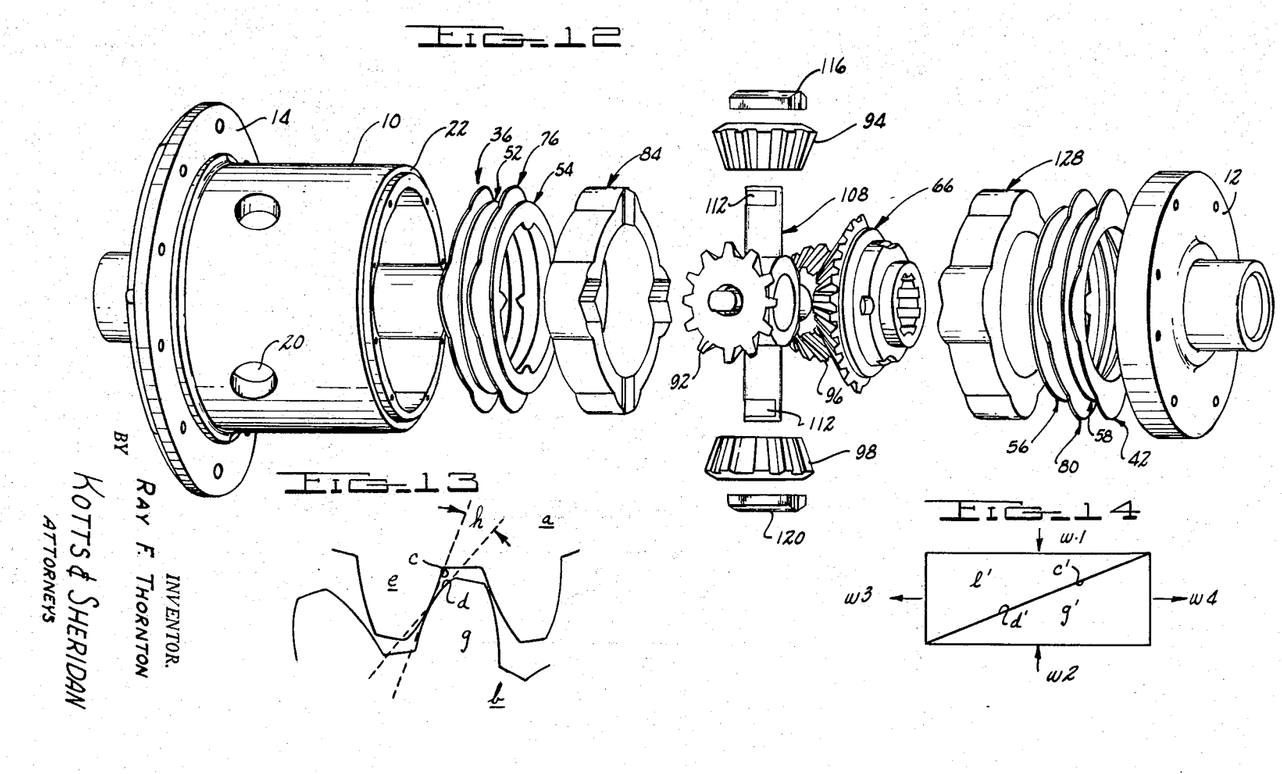
FIG. 12 is an exploded perspective view of the differential mechanism of the present invention.
FIG. 13 is a fragmentary view of the two gears in mesh, showing the pressure angle in dotted line.
FIG. 14 is a side elevation of two tapered blocks, demonstrating the principle of "spreading force" resulting from the pressure angle of meshed gears such as shown in FIG. 13.
Figure 15:
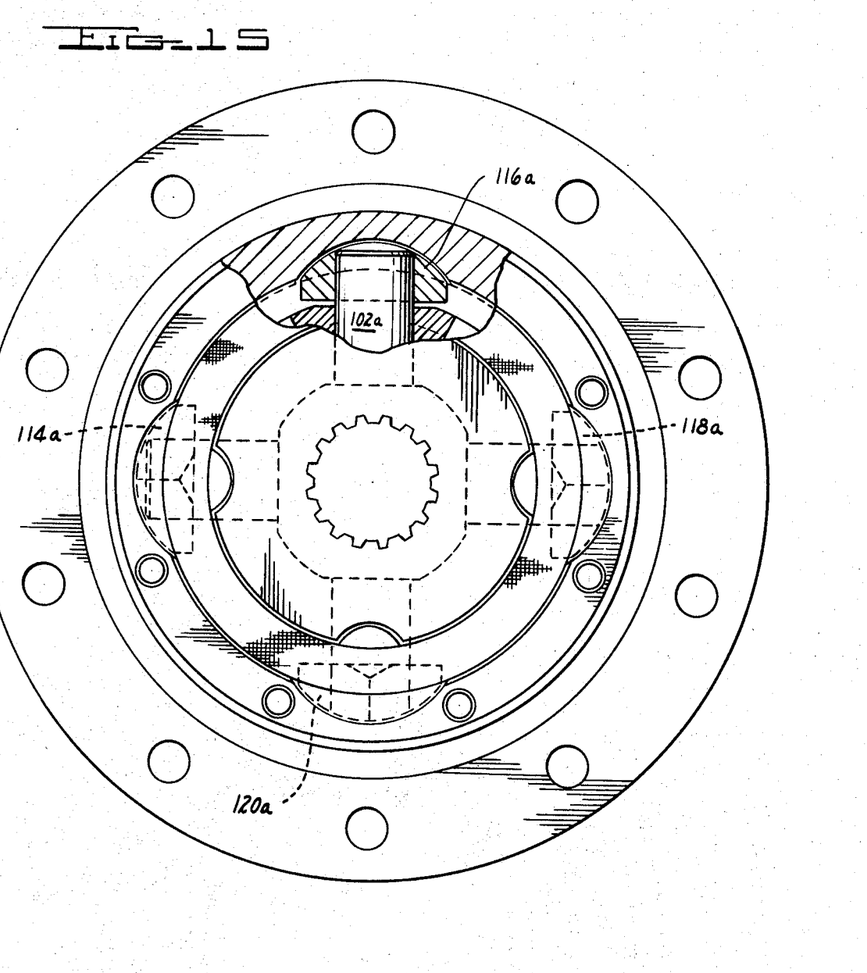
FIG. 15 is an end view of another embodiment of the present invention with the cap removed, a portion being broken away to reveal internal construction.

Referring to FIG. 13, two bevel gears $a$ and $b$ are shown with the faces $c$ and $d$ of teeth $e$ and $g$ engaged. The pressure angle of the teeth is demonstrated at $h$. This pressure angle is generally twenty to twenty-two and one-half degrees in automotive differential bevel gearing. It is the outward pressure resulting from this angle which causes the spreading force.

A simple demonstration of this principle is shown in FIG. 14. Two blocks $e^1$ and $g^1$ having tapered faces $c^1$ and $d^1$ are shown. If a force $w^1$ is applied downward in the direction of the arrow, there is an upward reaction force $w^2$ in the direction of the corresponding arrow. Sidewise forces $w^3$ and $w^4$ are developed because of the engaged tapered faces $c^1$ and $d^1$. Thus, if a force $w^1$ is applied, the blocks will spread or move sidewise—block $e^1$ to the left in the direction of force $w^3$ and block $g^1$ to the right in the direction of force $w^4$.

In my prior invention on a locking differential disclosed in U.S. Patent No. 2,971,404 issued Feb. 14, 1961, the power of the engine is used to create a cam action between the case and the spider pins. This cam action moves the pinion gears toward the side gears, and the side gears are utilized to actuate the locking mechanisms.

When one wheel of the vehicle moves faster than the other, as in turning a corner, the spider pins are moved back to neutral position, and planetary action of the gearing is created. In this planetary action there is a spread force such as demonstrated in FIGS. 13 and 14 of the drawings in the present application. The spread force is not sufficient to interfere with normal differential action in low or medium horsepower vehicles. However, with higher horsepower engines the planetary action develops a greater spread force, and this causes the side gears to spread sidewise and initiate a partial lock in the locking means. This partial lock is created when the unit is in differential action, and under certain circumstances this partial lock can cause chattering. In addition, the occurrence of this partial lock during differential action can create wear in the locking means.

It is a principal object of the present invention to provide an efficient locking differential wherein the locking mechanism is separated from the differential gearing so that the locking mechanism can move to the locked and unlocked positions independent of the differential gearing and wherein unlocking is initiated by rotation of the differential gearing.

It is another object of the present invention to provide a locking differential which utilizes a full lock, while maintaining conventional differential action when required.

It is another object of the present invention to provide such a locking differential which is easy to assemble and disassemble without special tools.

It is a further object of the present invention to provide a locking differential which is self aligning so that the unit is always in balance, and wherein errors in production can easily and inexpensively be accommodated during assembly.

It is another object of the present invention to provide an effective locking differential which is simple in construction and comparatively low in cost.

It is another object of the present invention to provide a locking differential utilizing an integral floating spider, with cam type locking surfaces thereon, contained completely inside the differential case and separated therefrom to allow full floating action of said spider.

It is another object of the present invention to provide a locking differential which is constructed and arranged to substantially eliminate any locking tendency resulting from spread force of the differential gearing when the gearing rotates.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The locking differential shown in the drawings comprises a case body 10 and cap 12. The case body 10 is provided with a flange 14, and a ring gear 16 is secured thereto with bolts 18. The case body 10 has lubricant holes 20 therein (FIG. 1) which permit lubricant to reach the interior of the differential. One end of the differential case body is stepped at 22 (FIG. 2) to seat the cap 12. The other end of the case body is provided with a bearing hub 24. It will be noted that cap 12 also has a bearing hub 26 formed thereon.

The ring gear 16 is adapted for engagement with the usual drive pinion (not shown). The drive pinion is connected through the drive shaft and propeller shaft to the transmission, and the transmission is coupled to the engine or power source.

The interior of the case body includes a flat backing face 28. A similar backing face 30 is provided in the cap 12. These backing faces are used to back up the spacer plates of the differential as will be explained later.

Figure 2:
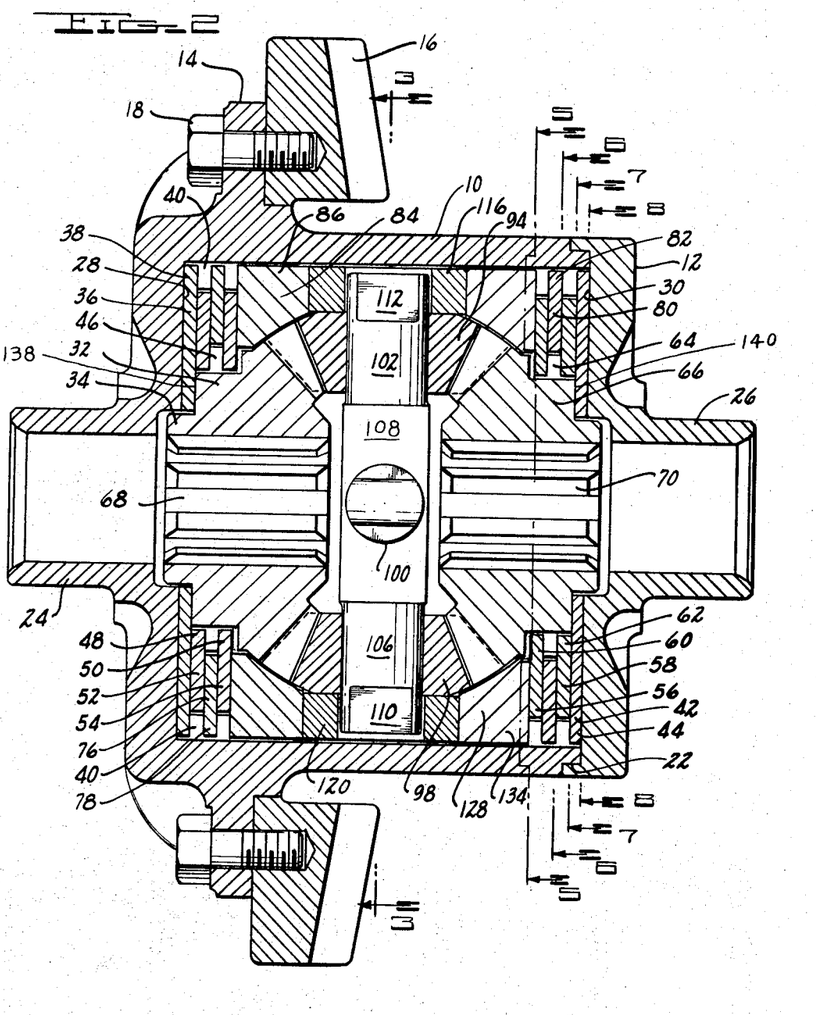
FIG. 2 is a rear mid-sectional elevation of the differential shown in FIG. 1, with the axle shafts removed.

Referring to FIG. 2 of the drawings, a side gear 32 is disposed within the case body 10. The side gear 32 includes a hub 34 which is seated in the case body as shown. A spacer plate 36 is disposed in the case body 10 adjacent the backing face 28. This spacer plate 36 has a central opening which fits over hub 34 in side gear 32.

The spacer plate 36 also has four outwardly extending lugs 38 which are seated in four curved grooves 40 in the case body 10.

Figure 8:
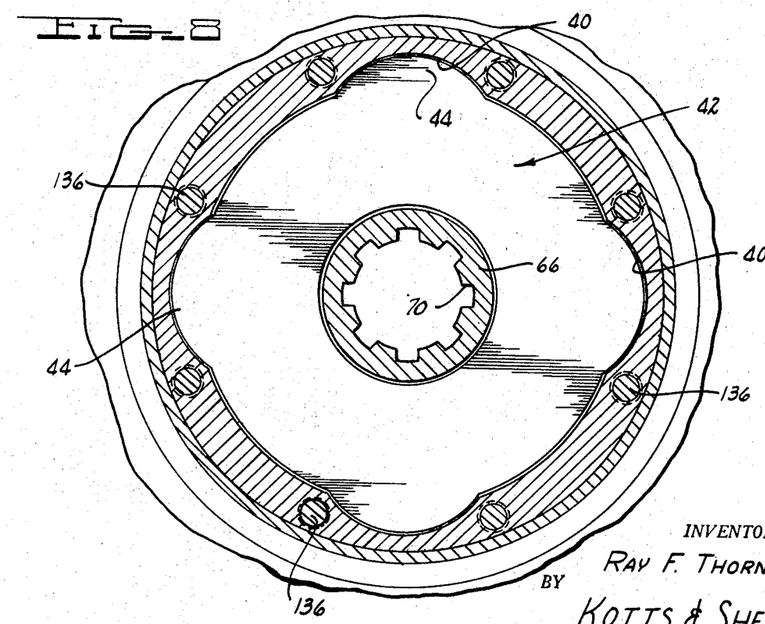
FIG. 8 is a sectional view taken along the line 8—8 in the direction of the arrows, FIG. 2.

The spacer plate is hardened and ground. This plate provides the first locking surface and acts as a thrust washer for side gear 32. It also acts an an anchor plate for the first lock-up plate to anchor a portion of the locking mechanism to the case through the lugs 38 (FIG. 2). A similar hardened and ground spacer plate 42 having lugs 44 thereon is shown in FIG. 8 of the drawings.

Figure 7:
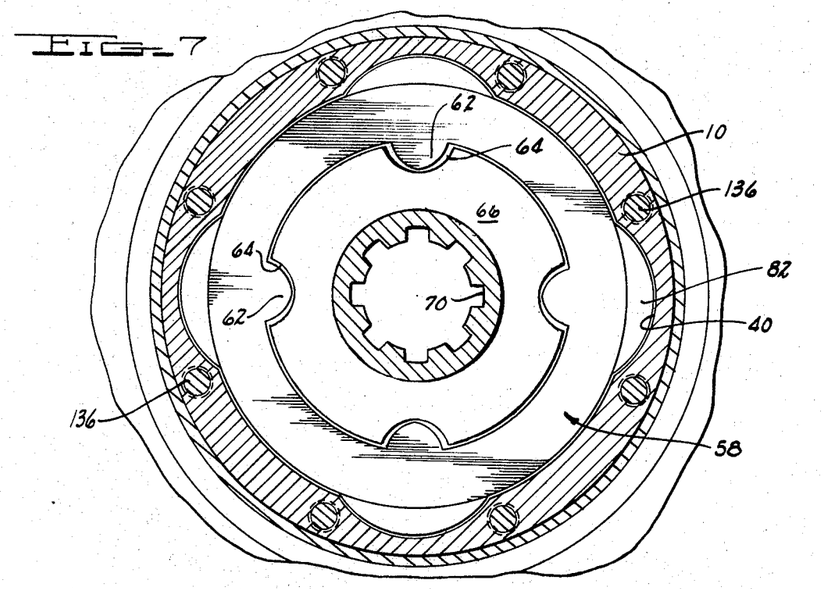
FIG. 7 is a sectional view taken along the line 7—7 in the direction of the arrows, FIG. 2.

Side gears 32 has four grooves 46 formed therein. These grooves 46 are adapted to seat the inwardly extending lugs 48 and 50 on the locking discs 52 and 54. Similar locking discs 56 and 58 having inwardly extending lugs 60 and 62 are shown on the right side of the differential in FIG. 2. These lugs 60 and 62 are shown here disposed in the four grooves 64 in the side gear 66 with a loose backlash fit, although such a loose backlash fit is not absolutely necessary. FIG. 7 demonstrates the manner in which disc 58 is disposed within the case body 10 with its lugs 62 extending into the grooves 64 in side gear 66. Thus, the discs 52 and 54 are keyed to side gear 32, and discs 56 and 58 are keyed to side gear 66. Side gears 32 and 66 are splined at 68 and 70 for splined engagement with suitable axle shafts such as shown at 72 and 74 in FIG. 1.

Figure 6:
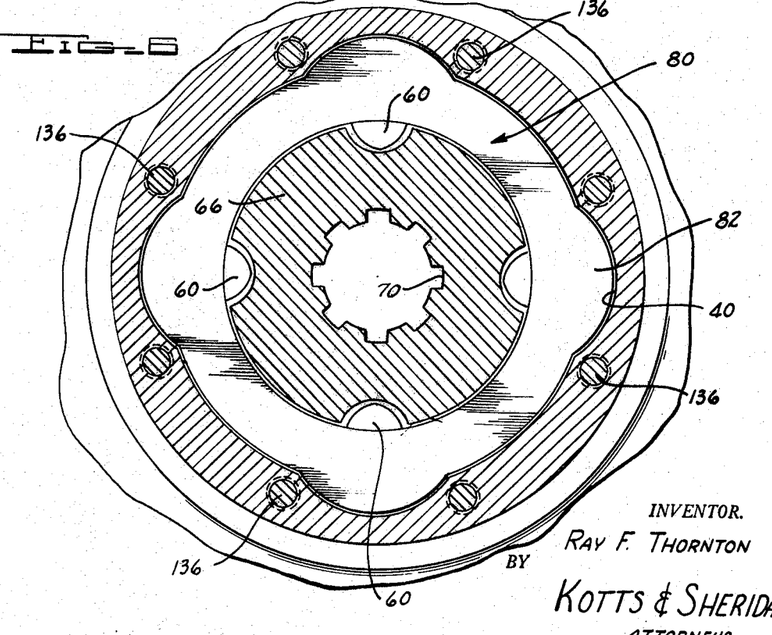
FIG. 6 is a sectional view taken along the line 6—6 in the direction of the arrows, FIG. 2.

Referring to FIG. 2, anchor plate 76 is disposed between locking discs 52 and 54, and has four lugs 78 therein which are positioned in the grooves 40 in the case body 10. Thus, spacer plate 36 and anchor plate 76 are keyed to the case body 10. Anchor plate 80 is provided on the right side of the differential. This anchor plate 80 has outwardly extending lugs 82 which are disposed in the grooves 40 in the case body 10. This particularly shown in FIG. 6 of the drawings.

A pressure ring 84 is disposed within case body 10 adjacent disc 54. This pressure ring has four raised portions 86 (FIG. 9) which fit into the grooves 40 in the case 10. The pressure ring 84 is provided with four cam openings, each cam opening having a forward cam face 88 and a rear cam face 90. The internal mechanism on the right side of the differential is the same as on the left. Pressure ring 128 is identical to pressure ring 84 and has four cam openings each having a forward cam face 130 and a rear cam face 132.

Raised portions 134 are formed on pressure ring 128, and these raised portions fit into the grooves 40 in case body 10.

Figures 9, 10, 11:
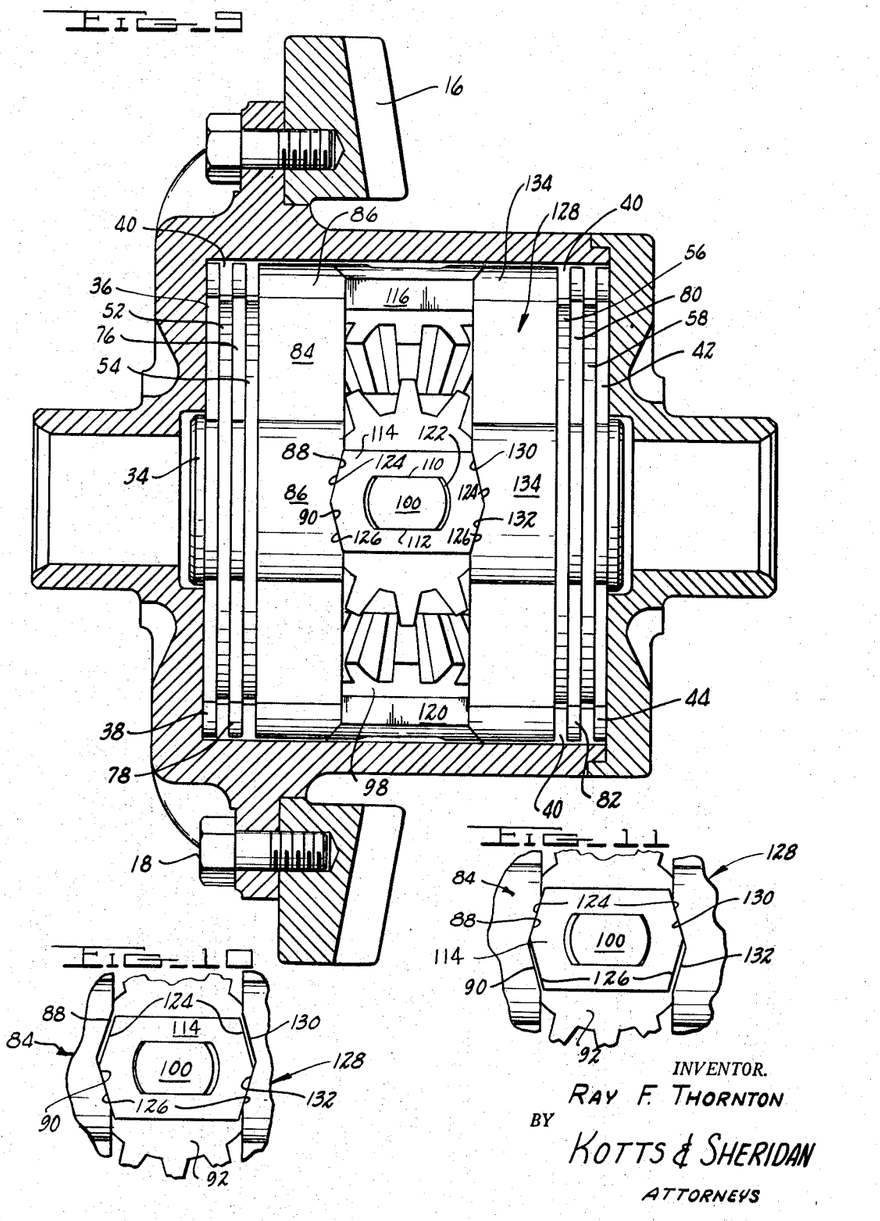
FIG. 9 is a rear sectional elevation similar to FIG. 2 except that the interior mechanism is not shown in section. In this view, the spider is shown in the neutral position.
FIG. 10 is a fragmentary view showing the position of the parts when the device is in the forward locked condition.
FIG. 11 is a fragmentary view showing the position of the parts when the device is in the reverse or back-up locked position.

Four pinion gears 92, 94, 96, and 98 (FIG. 3) are positioned in engagement with side gears 32 and 66. These pinion gears are rotatably positioned on spider trunnions 100, 102, 104, and 106 which extend from a unitary spider 108. Each of these spider trunnions has a flat forward face 110 and a flat rear face 112 thereon (FIG. 9).

Four balance bars (FIG. 3) 114, 116, 118, and 120 are provided, one on each spider trunnion 100, 102, 104 and 106, respectively. These balance bars are rounded on top to fit the contour of the case body 10. When the gears are pre-loaded, as explained later, these balance bars are forced against the case body 10. Each balance bar has a central opening which is of such width as to permit the balance bar to fit over the adjacent spider trunnion. However, the length of the opening in the balance bar is greater than the sidewise length of the spider trunnion. This leaves an opening such as shown at 122 in FIG. 9 between the sides of the spider trunnion and the balance bar. It will thus be apparent that each balance bar can move sidewise but not forward or back with respect to the adjacent spider trunnion. Each balance bar has a pair of forward faces 124 and a pair of rear faces 126 which mate with the forward faces 88 and 130 and rear faces 90 and 132 on pressure rings 84 and 128.

*Assembly of differential*

Figure 3:
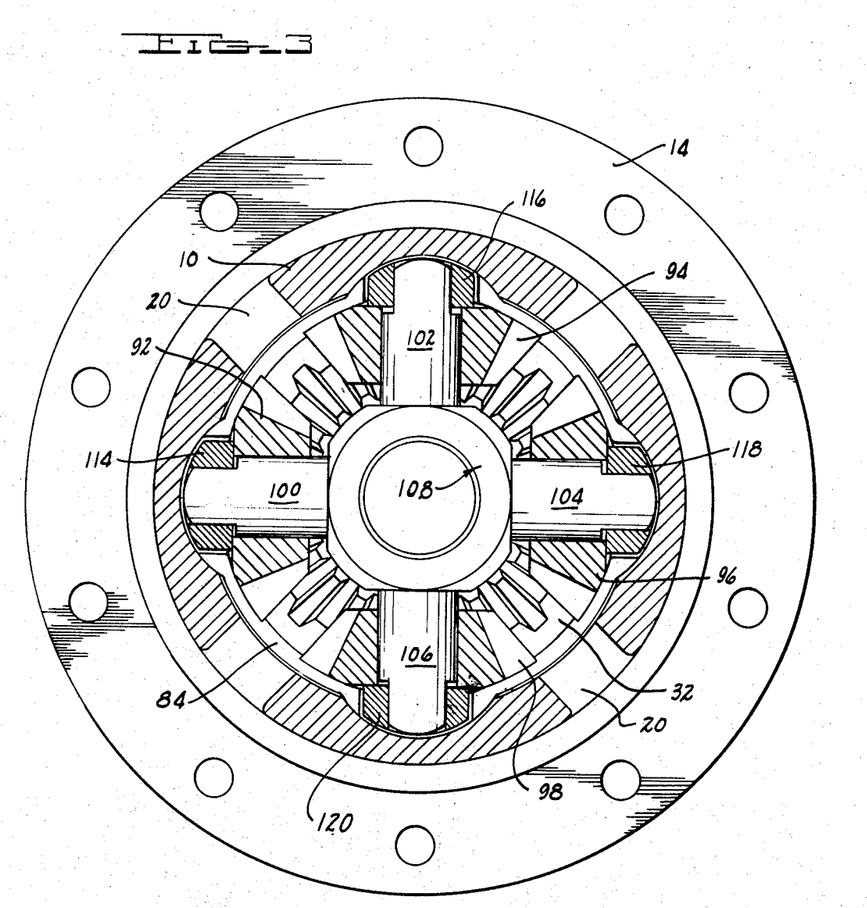
FIG. 3 is a sectional elevation taken along the line 3—3 in the direction of the arrows, FIG. 2, with ring gear removed.

The differential of the present invention is assembled as follows:

The plates 36, 52, 76 and 54 are dropped into place, and the pressure ring 84 follows. The discs 36 and 76 and the pressure ring 84 are guided into place since their lugs and raised portions 38, 78 and 86 fit into the four grooves 40 in the case body. The side gear 32 is then dropped in place so that its grooves 46 fit over the lugs 48 and 50 of the discs 52 and 54. The spider 108 with pinion gears 92, 94, 96 and 98 and balance bars 114, 116, 118 and 120 thereon is then placed inside the case (FIGS. 2 and 3). The side gear 66, the pressure ring 128, and the discs 56, 80, 58 and 42 are then dropped in place. The cap 12 is then affixed to the case body 10 by suitable means such as bolts 136.

It will be noted that the case used with the device of the present invention utilizes a body portion and an end cap.

The outermost spacer plate 42 can be made of various thicknesses to adjust running clearances and production errors. The combined errors of the assembled parts can be accommodated by merely varying the thickness of the spacer plate. For example, if there are various errors in the thicknesses of the locking plates, anchor plates, pressure rings, and case boring, these several errors are aggregated or totaled and the spacer plate 42 is made of suitable thickness to compensate this combined error and effect final adjustment in assembly.

In addition, the length of the side gears 32 and 66 can be ground on the backs 138 and 140 to determine the amount of pre-load on the differential gearing. This pre-load is created by bolting the cap 12 to the case body 10. The backing face 30 of cap 12 exerts a pressure on spacer plate 42 which in turn exerts a pressure on the back 140 of side gear 66, and this pressure is transferred throughout the gear assembly (not the clutch assembly) to backing face 28 on the left side of case body 10. The back 140 of side gear 66 will normally extend a few thousandths of an inch beyond the locking disc 58. The take-up of this few thousandths of an inch creates the pre-load. The shoulders 138 and 140 also transfer side thrust from the gears directly into the case through washers 36 and 42 so that this side thrust is independent of the locking or clutch mechanisms.

The balance bars 114, 116, 118, and 120 are moved against the case 10 as the gears are pre-loaded to accommodate the static outward thrust of the adjacent pinions. The engagement of the balance bars with the case also accommodates the additional outward thrust force created when the gearing is in differential action.

Unusual and highly desirable functions can be performed because the internal mechanism is full-floating and self-centering within the case for equal lock to both sides at all times and under any and all conditions.

*Operation*

The operation of the locking differential shown in the drawings is as follows:

When the vehicle is propelled forward, the ring gear 16 rotates forwardly or inwardly toward the plane of the drawing paper (FIG. 2). Since the case 10 is affixed to the ring gear, it also rotates forward. The pressure rings 84 and 128 are engaged with the case through their raised portions 86 and 134, so the pressure rings are moved forward also. As the case 10 and pressure rings 84 and 128 are moved forward, the balance bars 114, 116, 118 and 120 move to the rear. This is demonstrated in FIGS. 9 and 10 of the drawings wherein balance bar 114 moves from the neutral position shown in FIG. 9 to the locked position of FIG. 10. It will be noted that the rear cam faces 126 on balance bar 114 are moved along the rear cam faces 90 and 132 of the pressure rings 84 and 128. The cam faces cause a sidewise component of movement of the pressure rings in opposite directions. Pressure ring 84 moves against locking disc 54. Locking disc 54 moves against anchor plate 76, and anchor plate 76 moves against locking disc 52. Locking disc 52 moves against spacer plate 36 and spacer plate 36 moves against backing face 28 in the case body 10. Of course, this same action takes place on the right side of the differential through pressure ring 128, discs 56, 80, 58 and 42 and backing face 30 in cap 12. In this manner, the drive is from the case through the pressure rings and discs to the side gears.

FIG. 11 demonstrates the position of the balance bar 114 when the differential is rotated in the reverse direction as when a vehicle is backing up. The forward cam faces 124 on balance bar 114 move forward along the cam faces 88 and 130 on pressure rings 84 and 128.

In any instance, it will be noted that that balance bar can move sidewise on the spider trunnions so that there is an equal distribution of lock and pressure to both sides of the differential.

Figure 1:
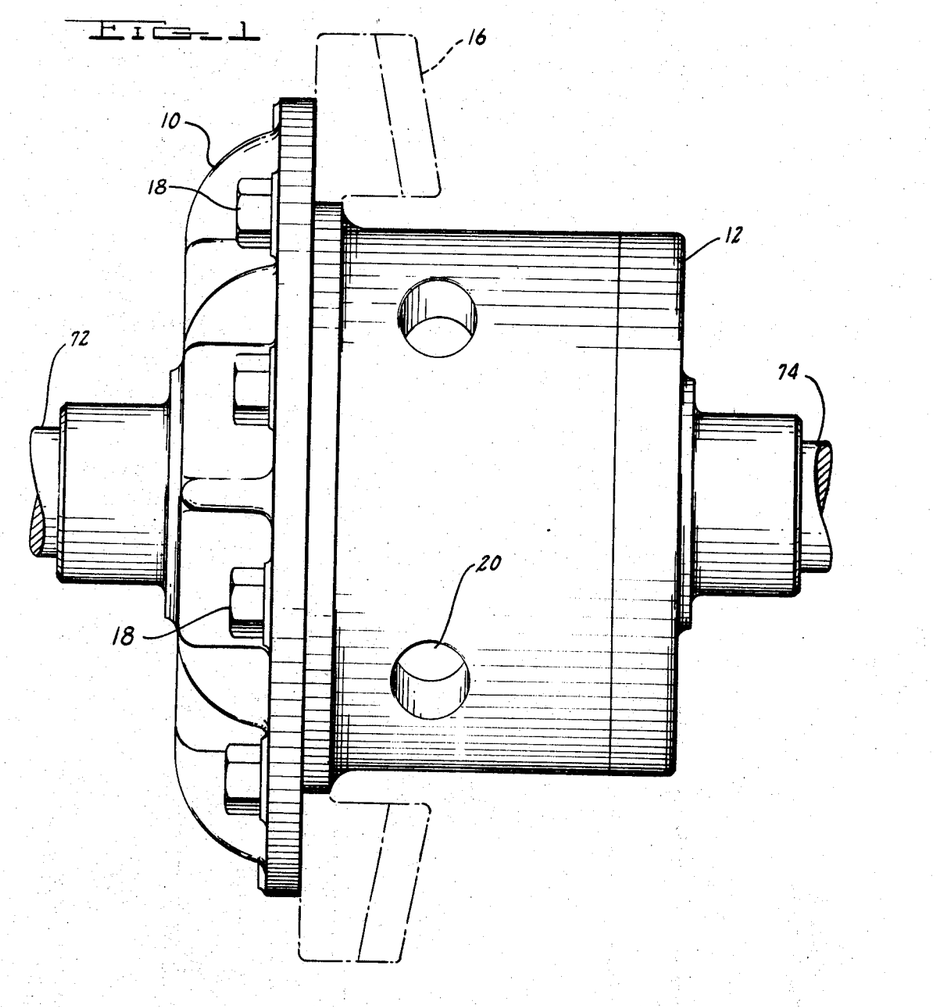
FIGURE 1 is a rear elevation of a vehicle locking differential showing one embodiment of the present invention, the axle shafts being shown in place.

When one axle shaft such as shown in FIG. 1 tends to turn faster than the other as when the vehicle is in a turn, for example a left turn, the following action takes place:

The side gear 66 which is affixed to an axle is rotated by the right vehicle wheel (not shown) which is the outside wheel in the turn. In such a turn, the right wheel rotates faster than the differential case, and the left or inside wheel rotates slower than the case. The side gear 32, which is coupled through an axle shaft to the inside wheel of the turn, becomes the anchor gear for the side gear 66. The gearing creates planetary action, and the spider trunnions and balance bars are moved forward to the neutral position of the cam surfaces.

Figure 4:
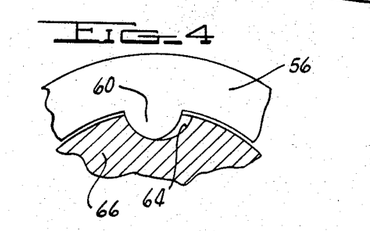
FIG. 4 is a fragmentary sectional view showing the lug 60 on locking disc 56 moved into engagement with the sidewall of the groove 64 in side gear 66, which position of the locking disc is achieved before the differential gearing is actuated into differential or planetary movement.
Figure 5:
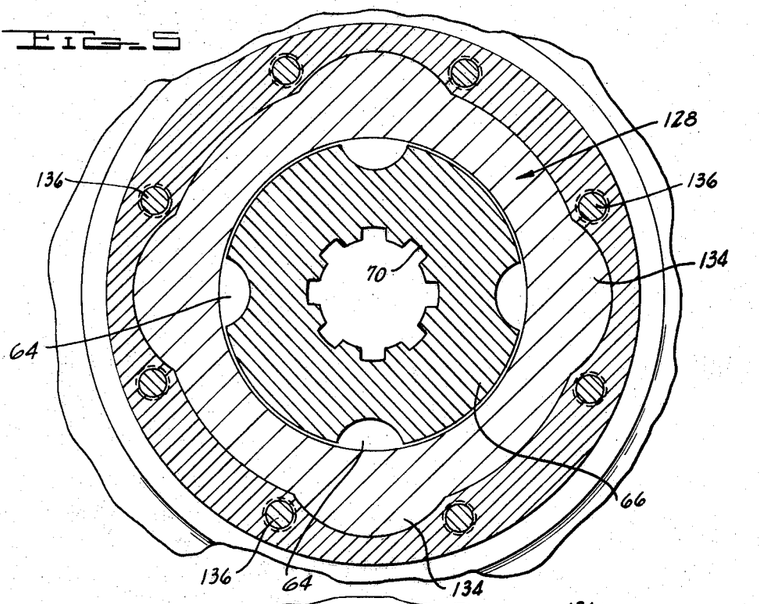
FIG. 5 is a sectional view taken along the line 5—5 in the direction of the arrows, FIG. 2.

At this time the lugs 48, 50, 60 and 62 on locking discs 52, 54, 56, and 58 are moved from the front to the rear walls of the grooves 46 and 64 in side gears 32 and 66. This movement is shown in FIG. 4 wherein lug 60 has moved to the rear wall of groove 64. During this movement the balance bars have moved down the cam faces on the pressure rings to the neutral position so that the device is completely unlocked before there is any turning of the discs 36, 76, 80 and 42 (which are connected with case body 10) with respect to discs 52, 54, 56 and 58 (which are connected with side gears 32 and 66). Of course, when the differential is again returned to straight forward driving the lugs of the locking discs are moved to the forward walls of the grooves in the side gears.

If desired, discs 52, 54, 56, and 58 may be made of bronze and the discs 36, 76, 80 and 42 of steel. This eliminates the sticking which normally occurs when discs of the same material are used throughout the construction.

Also, a facing formed of a material such as cork and a plastic resin may be bonded to both sides of certain of the discs if it is desired to form all of the discs from steel. This cork material has been found to increase the co-efficient of friction while retaining good resistance to break-down and wear. It has been found that when this material is used, the plates or discs may be pre-loaded in assembly because the cork has a certain amount of resilience.

It will be noted that the floating spider pin may move sidewise. This accommodates irregularities in the gearing. The floating spider may also move up or down to accommodate such irregularities.

Another embodiment of the present invention is shown in FIGS. 15–18 of the drawings and parts corresponding to those described in connection with FIGS. 1–11 are given the same reference numbers with the suffix *a* added. In this arrangement, the balance bars are so constructed and arranged that they may rotate on their respective spider pins to provide full self centering of the balance bars during locking or unlocking action. This differs from the balance bars 114, 116, 118, and 120 shown in the embodiment of FIGS. 1–11 wherein the balance bars cannot rotate on the spider pins.

Figures 16, 17, 18:
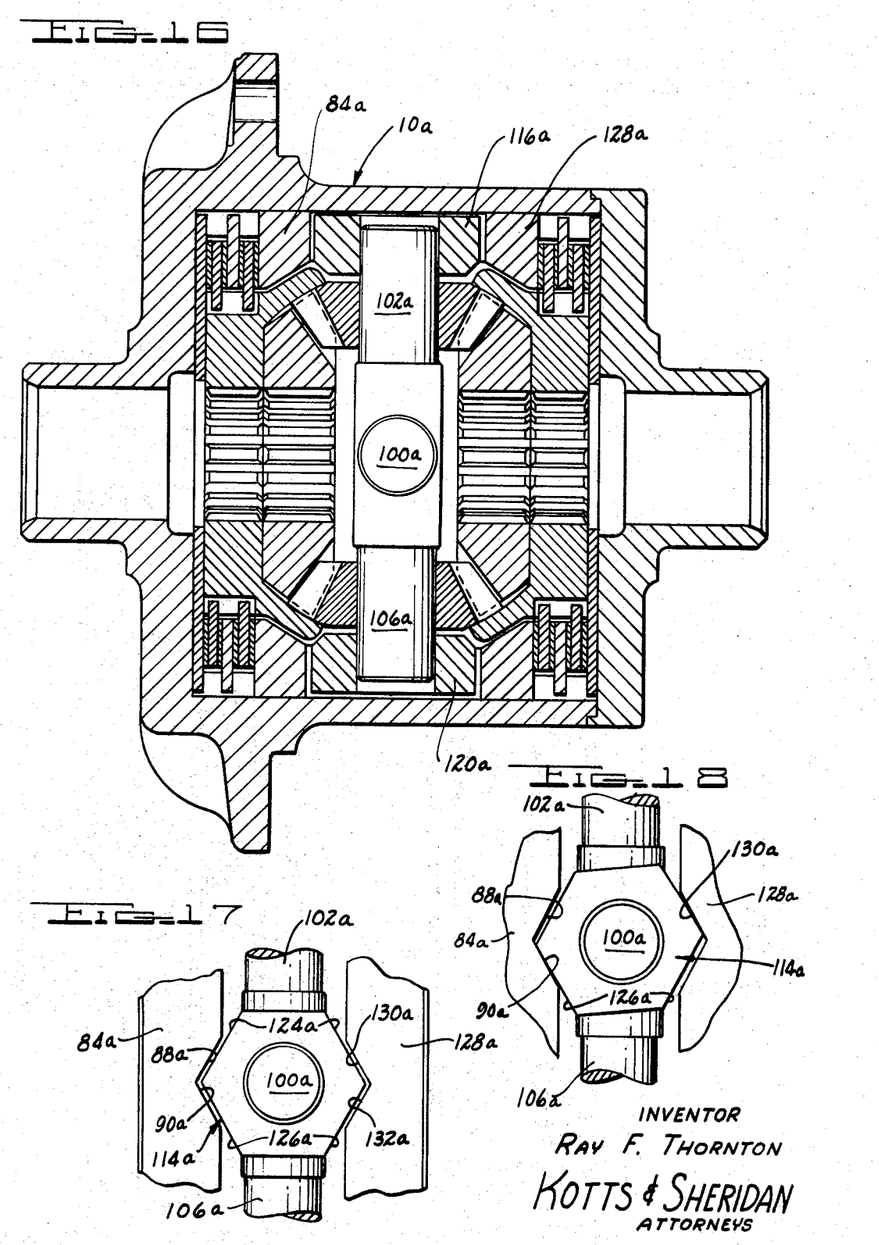
FIG. 16 is a rear mid-sectional elevation of the embodiment shown in FIG. 15.
FIG. 17 is a fragmentary plan view of the actuating mechanism, the differential case being removed.
FIG. 18 is a view similar to FIG. 17 showing the balance bar rotated on the spider pin as the differential is locked.

Four balance bars 114*a*, 116*a*, 118*a* and 120*a* are shown in the embodiment of FIGS. 15–18. These balance bars may tend to rotate on their pins as the differential case 10*a* is rotated. One such balance bar 114*a* is shown in FIGS. 17 and 18 of the drawings. FIG. 17 shows the balance bar 114*a* in the neutral position. FIG. 18 shows what happens if the balance bars rotate as the differential case is rotated by the power source. One front cam face 124*a* on the balance bar 114*a* engages the cam face 130*a* on the pressure ring 128*a*, and one rear cam face 126*a* on the balance bar has engaged the cam face 90*a* on the pressure ring 84*a* as shown in FIG. 18. This action spreads the pressure rings 84*a* and 128*a* to the locked position against the clutch plates. When differential action occurs, the balance bar returns to the neutral position, and the pressure rings 84*a* and 128*a* move inwardly to the unlocked position, relieving the pressure on the clutch plates. The balance bar can rotate either clockwise or counterclockwise on the pin 100*a*, and locking can be obtained in either a froward or reverse rotation of the differential.

It will be noted in this modification that the side gears are of a two piece construction including a side gear element and an overlying side gear cup. The overlying side gear cup prevents outward thrust of the pinions. This two piece gear construction can also be used with the balance bar construction shown in FIGS. 1–14 of the drawings.

Figure 19:
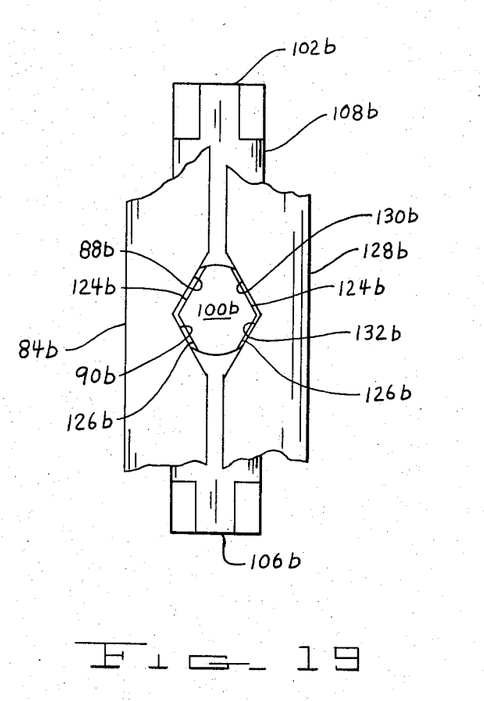
FIG. 19 is a fragmentary plan view of another embodiment of the actuating mechanism which does not utilize a balance bar.

Another embodiment of the actuating mechanism, which eliminates the balance bar, is shown in FIG. 19 of the drawings and parts corresponding to those previously described are given the same reference numerals with the suffix *b* added. In this embodiment, the spider 108*b* has four spider pins extending outwardly ninety degrees apart, three such pins being shown at 100*b*, 102*b* and 106*b*. Each spider pin has four cam faces directly thereon. Pressure rings are indicated at 84*b* and 128*b*. These pressure rings have cam surfaces which engage the cam faces of the spider pins.

The spider pin 100b has front cam faces 124b and rear cam faces 126b which are adapted to engage cam surfaces 88b and 130b and 90b and 132b, respectively, of the pressure rings. The operation of this embodiment is much the same as the others. Pinions are rotatably disposed on the spider pins and engage side gears. The pressure rings engage suitable clutch elements at each side of the differential. This embodiment may be used with either a one piece or a two piece side gear construction such as shown in FIGS. 2 and 16 of the drawings.

In the various embodiments clearances are provided as required to give a floating, self-aligning action of the locking mechanism wherein the cam applied locking forces to the two pressure rings are balanced or equalized and separated from the gear tooth forces. It is desirable that the pinions be mounted on the spider pins with a loose fit such that self centering and balanced seating of the respective cam surfaces is obtained. This provides for floating spider pins and a floating coupling action between the cam means and the spider pins. Loose fits or clearances between plates 54 and 56 and side gears 138 and 140, and between the pressure rings and the case are preferably provided. A clearance may be designed along the pitch line between the side gears and pinions.

From the foregoing, it will be seen that I have provided an efficient locking differential which does not require extremely close tolerances on the component parts. Thus, the device lends itself to mass production methods. The cam or clutch actuating mechanism in each embodiment is such that the cam forces are independent of the gearing and this makes it possible for the clutches to be pressurized independently of the gearing and to eliminate "false locks" due to gear spreading forces. Additionally, each embodiment provides a balance means for equalizing the cam forces applied to opposite pressure rings. Modifications in the precise constructions disclosed may be made within the scope of the invention as defined in the appended claims.

Having thus described my invention, I claim:

1. In a differential power transmission for use with a power source; a case; a pair of side gears disposed within said case and adapted for coupling with a pair of axle shafts each side gear having a hub; a floating spider disposed between said side gears and having a plurality of radial trunnions; pinions on said trunnions in mesh with said side gears; a flat face formed on the front and back of each spider trunnion; a balance bar having an opening therein with flat front and rear walls disposed over each spider trunnion in engagement with said flat faces and outside the pinion; converging cam faces formed on opposite sides of each balance bar; two clutch actuator rings each having a forward and rear cam face adapted to engage the cam faces on the balance bars; a plurality of clutch discs, certain of said discs being engaged with the case and certain of said clutch discs being engaged with the side gear hubs; power from the power source rotating the case and causing the clutch actuator cam faces to move against the balance bar cam faces, which action spreads the clutch actuator rings apart and locks the clutch discs together to prevent rotation of said side gears relative to said case.

2. A differential power transmission for use with a power source comprising a rotatable driving member adapted to be operatively coupled with the power source; a pair of side gears mounted within said driving member for rotation relative thereto; a floating spider positioned inside said driving member between said side gears, said spider having radial trunnions; a pinion rotatably mounted on each of said trunnions in mesh with said side gears; a pair of movable clutch actuators connected to said driving member for rotation therewith and disposed on opposite sides of said spider; clutch means associated with the clutch actuators and operated by movement thereof for locking the side gears to the driving member to rotate therewith; and cam means interconnecting said spider and clutch actuators for moving the actuators to actuate the clutch means.

3. A differential power transmission for use with a power source, comprising a rotatable driving member adapted to be operatively coupled with the power source; a pair of side gears disposed within said driving member; a floating spider positioned inside said driving member between said side gears, said spider having a plurality of trunnions extending radially therefrom; a plurality of pinions, one rotatably mounted on each of said trunnions in mesh with said side gears; said side gears, spider and pinions providing a differential gearing, a pair of laterally slidable clutch actuators connected to said driving member for rotation therewith and disposed one on each side of said spider; cam means between said spider and clutch actuators for moving the actuators laterally upon rotation of the spider relative to the driving member; and clutch means associated with said clutch actuators for locking both said side gears against movement relative to said driving member upon lateral movement of the clutch actuators; rotation of one side gear at a speed different than the rate of rotation of the driving member adjusting the cam means to reduce pressure on the clutch means and provide for differential action of the gearing.

4. A differential power transmission for use with a power source, comprising a rotatable driving member adapted to be operatively coupled with the power source; a pair of side gears disposed within said driving member; a floating spider positioned inside said driving member between said side gears; said spider having a plurality of trunnions extending radially therefrom; a plurality of pinions, one rotatably mounted on each of said trunnions in mesh with said side gears; balance means engaging said trunnions, said balance means having cam faces thereon; clutch actuating means spreadable laterally toward opposite sides of said driving member, said clutch actuating means having cam faces which engage the balance means cam faces; and clutch means adjacent said clutch actuating means for locking both said side gears against movement relative to said driving member upon the rotation of said driving member by the power source and movement of the clutch actuating means cam faces against the balance means cam faces to laterally spread said clutch actuating means; rotation of one side gear at a speed different than the rate of rotation of the driving member adjusting the cam faces on the balance means and actuating means to a neutral position, thus unlocking both side gears and permitting conventional differential action of the gearing.

5. A differential power transmission for use with a power source, comprising a rotatable driving member adapted to be operatively coupled with the power source; a pair of side gears disposed within said driving member; a floating spider positioned inside said driving member between said side gears, said spider having a plurality of trunnions extending radially therefrom; a plurality of pinions, one rotatably mounted on each of said trunnions in mesh with said side gears; balance means engaging said trunnions, said balance means having cam faces thereon; a pair of laterally slidable clutch actuators engaged with said driving member for rotation therewith and disposed one on each side of said balanced means, said clutch actuators having cam faces which engage the cam faces on the balance means; a plurality of clutch discs at each side of said driving member adjacent the clutch actuators for locking the device, certain of said clutch discs engaging said driving member and certain of said clutch discs engaging said side gears; and a pair of end plates one disposed at the back face of each side gear to take the end thrust of said side gears; rotation of said driving member by the power source and movement of the clutch actuator cam faces against the balance means cam faces spreading said clutch actuators apart and moving said clutch discs together to lock the device; rotation of one side gear at a speed different than the rate of rotation of the driving member adjusting the cam faces on the balance means and clutch actuators to a neutral position, thus unlocking the device and permitting conventional differential action of the gearing.

6. A differential power transmission for use with a power source, comprising a rotatable driving member adapted to be operatively coupled with the power source; a pair of side gears disposed within said driving member; a floating spider positioned inside said driving member between sad side gears, said spider having a plurality of trunnions extending radially therefrom; a plurality of pinions, one rotatably mounted on each of said trunnions in mesh with said side gears; balance means engaging said trunnions, said balance means having cam faces thereon; a pair of laterally slidable clutch actuators engaged with said driving member for rotation therewith and disposed one on each side of said balanced means, the said clutch actuators having cam faces engaging the cam faces on the balance means; a plurality of clutch discs at each side of said driving member adjacent the clutch actuators for locking the device, certain of said discs engaging said driving member and certain of said discs engaging said side gears; and a pair of end plates one disposed at the back face of each side gear to take the end thrust of said side gears, said end plates being of sufficient thickness to accurately locate the gearing; rotation of said driving member by the power source and movement of the clutch actuator cam faces against the balance means cam faces spreading said clutch actuators apart and moving said clutch discs together to lock the device; rotation of one side gear at a speed different than the rate of rotation of the driving member adjusting the cam faces on the balance means and clutch actuators to a neutral position, thus unlocking the device and permitting conventional differential action of the gearing.

7. A differential power transmission for use with a power source, comprising a rotatable driving member adapted to be operatively coupled with a power source; a pair of side gears disposed within said driving member; a floating spider positioned inside said driving member between said side gears, said spider having a plurality of trunnions extending radially therefrom; a plurality of pinions, one rotatably mounted on each of said trunnions in mesh with said side gears; balance means engaging said trunnions, said balance means having cam faces thereon; a pair of laterally slidable clutch actuators engaged with said driving member for rotation therewith and disposed one on each side of said balance means, the said clutch actuators having cam faces which engage the cam faces on the balance means; a plurality of clutch discs at each side of said driving member adjacent the clutch actuators for locking the device, certain of said clutch discs engaging said driving member and certain of said discs engaging said side gears; and a pair of end plates one disposed at the back face of each side gear to take the end thrust of said side gears; rotation of said driving member by the power source and movement of the clutch actuator cam faces against the balance means cam faces spreading said clutch actuators apart and moving said clutch discs together to lock the device; rotation of one side gear at a speed different than the rate of rotation of the driving member adjusting the cam faces on the balance means and clutch actuators to a neutral position, thus unlocking the device and permitting conventional differential action of the gearing.

8. A differential power transmission for use with a power source, comprising a rotatable driving member adapted to be operably coupled with the power source; differential gearing associated with said driving member and including a spider capable of rotary movement relative to the driving member; clutch actuating means engageable with said spider and movable independently of said gearing and driving member upon predetermined rotary movement of the spider relative to the driving member; and clutch means engaged with and operated by said clutch actuating means and adapted to lock said differential gearing upon rotary movement of the spider relative to said driving member and resultant movement of said clutch actuating means; said spider and clutch actuating means having a neutral position which permits conventional differential action of said gearing.

9. A differential power transmission for use with a power source, comprising a rotatable driving member, a floating spider inside said driving member and having a plurality of spider pins extending therefrom; a plurality of pinion gears one rotatably mounted on each of said spider pins; a pair of side gears inside said driving member and in mesh with said pinion gears; a plurality of balance members one rotatably disposed on each of said spider pins; clutch actuating means positioned adjacent said floating spider which clutch actuating means is in engagement with said balance members and is laterally spreadable independently of said differential gearing; and clutch means at each side of said driving member and engageable with said clutch actuating means; said clutch means being adapted to lock said differential gearing upon movement of the floating spider forward or back relative to said driving member and resultant movement of said balance members and spreading of said clutch actuating means.

10. A differential power transmission for use with a power source, comprising a rotatable driving member; differential gearing disposed inside said driving member; a floating spider inside driving member; clutch actuating means positioned adjacent said spider which clutch actuating means is laterally spreadable independent of said gearing; rotatable balance members disposed on said floating spider for spreading said actuating means; and clutch means at each side of said driving member adapted to lock said differential gearing upon movement of the floating spider forward or back relative to said driving member and resultant movement of the balance members and spreading movement of said clutch actuating means.

11. A differential power transmission for use with a power source, comprising a rotatable driving member; differential gearing disposed in said driving member; floating cam means in said driving member having first cam surface means thereon; and clutching means in said driving member having second cam surface means thereon engaging the first cam surface means, said clutching means being laterally spreadable independently of said differential gearing due to interaction of said first and second cam surface means to lock said differential gearing against rotation relative to said driving member when said driving member is rotated about its axis.

12. A differential power transmission for use with a power source, comprising a rotatable driving member; a movable spider disposed in said driving member and having spider pins extending outwardly therefrom; a plurality of pinion gears one rotatably mounted on each of said spider pins; a pair of side gears in said driving member in mesh with said pinion gears; clutch actuating means adjacent the spider pins and engageable therewith which clutch actuating means is spreadable by said spider pins independently of said differential gearing parallel to the axis of the differential power transmission; and clutch means adjacent said actuating means, which clutch means is engageable with said clutch actuating means and is actuated by said movable spider and actuating means to lock said differential gearing against rotation.

13. A differential power transmission for use with a power source, comprising a rotatable casing adapted to be operatively coupled with the power source; differential gearing disposed inside said casing; a floating spider inside said casing and rotatable relative thereto, clutch and clutch actuating means positioned on opposite sides of said spider in engagement with said spider and being laterally spreadable independently of said gearing and adapted to lock said differential gearing upon transfer of pressure from said spider to said clutch and clutch actuating means, which pressure results in spreading thereof and locking of said gearing to the casing.

14. In a differential power transmission for use with a power source, a case; a pair of rotatable side gears disposed within said case and adapted for coupling with a pair of shafts; a floating spider disposed between said side gears and having a plurality of trunnions extending radially outward therefrom; a plurality of pinions one rotatably mounted on each of the spider trunnions, said pinions being in mesh with said side gears; first cam faces on each of said spider trunnions; two clutch actuating rings one disposed on each side of said spider and having second cam faces adapted to engage the first cam faces on said spider trunnions; and clutch means on opposite sides of said spider; said differential power transmission locking upon transfer of force from said spider through the cam faces to said clutch actuating rings and said clutch means independently of the gearing, and said differential power transmission unlocking upon rotation of one side gear at a speed different from the speed of rotation of the case.

15. A differential power transmission for use with a power source, comprising a rotatable driving member adapted to be operatively coupled with the power source; a pair of side gears disposed within said driving member; a floating spider positioned inside said driving member between said side gears, said spider having a plurality of trunnions extending radially therefrom; a plurality of pinions, one rotatably mounted on each of said trunnions in mesh with said side gears; first cam faces on said spider trunnions; a pair of laterally spreadable clutch actuators engaged with said driving member for rotation therewith and disposed on each side of said spider, said clutch actuators having second cam faces which are adapted to engage the first cam faces on said spider trunnions; a plurality of clutch discs at each side of said driving member adjacent the clutch actuators for locking the device, certain of said clutch discs engaging said driving member and certain of said clutch discs engaging said side gears; and a pair of end plates one disposed at the back face of each side gear to take the end thrust of said side gears, rotation of said driving member by the power source resulting in spreading of the clutch actuators by the spider through the cam faces and moving the clutch discs together to lock the side gears to the driving member.

16. In a locking differential, a rotatable case having an axis about which it rotates, differential gearing inside the case including a spider pin and pinions mounted on the spider pin, said gearing including a pair of side gears engaging the pinions and adapted for connection to a pair of axle shafts, said side gears being rotatable on said axis, a pair of clutch means for locking said respective side gears to said case to rotate therewith, a pair of pressure rings for actuating said clutch means, said pressure rings being rotatable with the case but shiftable therein along said axis, each end of said spider pin having a cam in abutment with both said pressure rings and acting to shift said pressure rings to operate the respective clutch means upon rotaton of the case relative to the spider pin.

17. The invention set forth in claim 16 including thrust washers between said side gears and the case arranged to transmit side thrust of the gearing into the case independently of said clutch means.

18. In a locking differential, a rotatable case having an axis about which it rotates, differential gearing inside the case including a spider pin and pinions mounted on the spider pin, said gearing including a pair of side gears engaging the pinions and adapted for connection to a pair of axle shafts, said side gears being rotatable on said axis, a pair of clutch means for locking said respective side gears to said case to rotate therewith, clutch actuating means engageable with said clutch means, cam means located inside said case and engageable with the clutch actuating means for applying force to the clutch means to lock said side gears to the case upon rotation of the case relative to the side gears, said cam means applying said force to said clutch means independently of said gearing, and thrust washers between said side gears and the case arranged to transmit side thrust of the gearing into the case independently of said clutch means.

19. In a locking differential, a rotary case having an axis of rotation, differential gearing inside the case including a spider having pinions thereon and a pair of side gears engaging the pinions, said side gears being rotatable about said axis and adapted for connection to a pair of axles, a pair of clutch means for locking the respective side gears to the case so that said differential gearing will rotate as a unit with the case, clutch actuating means engageable with the clutch means and cam means located entirely inside the case and engageable with the clutch actuating means for applying pressure to both the clutch means to lock the side gears to the case, said cam means being constructed and arranged so that rotation of a side gear at a rate of rotation greater than that of the case will release pressure on the clutch means to unlock the side gears and provide differential action of said gearing.

20. In a locking differential, a rotary case having an axis of rotation, a pair of side gears inside said case and adapted for connection to a pair of axles, a pair of clutch means for locking the respective side gears to the case, each clutch means including an element shiftable along said axis to lock and unlock a side gear with the case, at least one pinion in said case engaging both said side gears to provide a differential gearing, a floating spider inside said case rotatably carrying said pinion, and cam means located inside said case interconnecting a common portion of said spider and both said clutch elements whereby rotation of said spider relative to the case provides camming pressure to shift said clutch elements.

21. In a differential power transmission for use with a power source; a rotatable driving member adapted to be operatively coupled with a power source; differential gearing disposed in said driving member; a floating spider in said driving member; clutch actuating means positioned adjacent said spider and having cam surfaces thereon, which clutch actuating means is laterally spreadable independent of said differential gearing; cam means engaging the spider and engageable with said clutch actuating means, said cam means being constructed to accommodate sidewise movement of said spider relative thereto while preventing forward and back movement of the spider relative thereto; and clutch means at each side of said driving member in abutment with said clutch actuating means and adapted to lock said differential gearing upon movement of the floating spider forward and back relative to said driving member.

22. In a differential power transmission for use with a power source: a case; a pair of rotatable side gears disposed in said case; a floating spider positioned between said side gears and having at least one trunnion extending radially therefrom; a pinion rotatably mounted on said trunnion, said pinion being meshed with the side gears to provide differential gearing; cam means engaging the spider trunnion, said cam means being constructed to accommodate sidewise movement of the spider relative thereto while preventing forward and back movement of the spider relative thereto; and clutch and clutch actuating means positioned on opposite sides of said spider and including cam surfaces adapted to engage the said cam means whereby the differential gearing is locked upon transfer of force from the spider to the clutch actuating means independently of the differential gearing; said differential gearing unlocking upon rotation of one side gear at a speed different from the speed of rotation of the case by an external rotational force applied to the said side gear.

References Cited

UNITED STATES PATENTS

| | | | |
|---|---|---|---|
| 1,358,434 | 11/1920 | Ford | 74—710.5 |
| 1,481,889 | 1/1924 | Carhart | 74—711 X |
| 2,509,560 | 5/1950 | Craft. | |
| 2,769,353 | 11/1956 | Nash | 74—711 |
| 3,051,020 | 8/1962 | Hartupee | 74—710.5 |

FRED C. MATTERN, Jr., *Primary Examiner.*

DAVID J. WILLIAMOWSKY, *Examiner.*

J. A. WONG, *Assistant Examiner.*